United States Patent
Moreno et al.

(10) Patent No.: US 9,998,356 B2
(45) Date of Patent: Jun. 12, 2018

(54) SYNCHRONIZING NETWORK CONVERGENCE AND VIRTUAL HOST MIGRATION

(71) Applicant: CISCO TECHNOLOGY, INC., San Jose, CA (US)

(72) Inventors: Victor Manuel Moreno, Carlsbad, CA (US); Dhananjaya Rao, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 204 days.

(21) Appl. No.: 14/800,269

(22) Filed: Jul. 15, 2015

(65) Prior Publication Data
US 2017/0019328 A1 Jan. 19, 2017

(51) Int. Cl.
| | |
|---|---|
| G06F 15/173 | (2006.01) |
| H04L 12/707 | (2013.01) |
| H04L 29/08 | (2006.01) |
| G06F 9/455 | (2018.01) |

(52) U.S. Cl.
CPC .......... *H04L 45/22* (2013.01); *G06F 9/45558* (2013.01); *H04L 67/1095* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,239,863 B2 | 8/2012 | Bhat et al. | |
| 8,315,157 B2 | 11/2012 | Moreno et al. | |
| 8,331,362 B2 | 12/2012 | Shukla et al. | |
| 8,429,647 B2 | 8/2013 | Zhou et al. | |
| 8,539,045 B2 | 9/2013 | Kang et al. | |
| 8,554,900 B2 | 10/2013 | Nelson | |
| 8,693,485 B2 | 4/2014 | Kotha et al. | |
| 8,694,644 B2 | 4/2014 | Chen et al. | |
| 8,874,742 B2 | 10/2014 | Johnsen et al. | |
| 2008/0222375 A1* | 9/2008 | Kotsovinos | G06F 9/5083 711/162 |
| 2010/0242045 A1* | 9/2010 | Swamy | G06F 9/455 718/104 |
| 2010/0275199 A1 | 10/2010 | Smith et al. | |

(Continued)

OTHER PUBLICATIONS

Ghorbani, et al., "Transparent, Live Migration of a Software-Define Network," SoCC '14, Nov. 3-5, 2014, 14 pages; http://dl.acm.org/citation.cfm?id=2670982.

*Primary Examiner* — Mohamed Ibrahim
(74) *Attorney, Agent, or Firm* — Polsinelli PC

(57) ABSTRACT

A system and a method are disclosed for synchronizing network convergence and virtual host migration in a network environment. An exemplary method includes upon receiving a message indicating that a mobile host manger will migrate a virtual host from a source node to a destination node in a network, pre-calculating a route for the virtual host at the destination node; and upon receiving a message indicating that the mobile host manager will freeze the virtual host, activating the pre-calculated route at a switch to minimize packet loss while the network converges. The pre-calculated route may be activated at a switch through which the virtual host at the source node connected to the network.

12 Claims, 3 Drawing Sheets

(56) References Cited

U.S. PATENT DOCUMENTS

| | | |
|---|---|---|
| 2011/0134931 A1 | 6/2011 | Merwe et al. |
| 2011/0321041 A1* | 12/2011 | Bhat ..................... G06F 9/4856 718/1 |
| 2012/0185856 A1* | 7/2012 | Ashihara ............... G06F 9/4856 718/1 |
| 2013/0215888 A1 | 8/2013 | Zhang et al. |
| 2013/0263125 A1 | 10/2013 | Shamsee et al. |
| 2014/0013324 A1 | 1/2014 | Zhang et al. |
| 2014/0075047 A1* | 3/2014 | Narasimhan ........ H04L 41/0813 709/238 |
| 2014/0250220 A1 | 9/2014 | Kapadia et al. |

\* cited by examiner

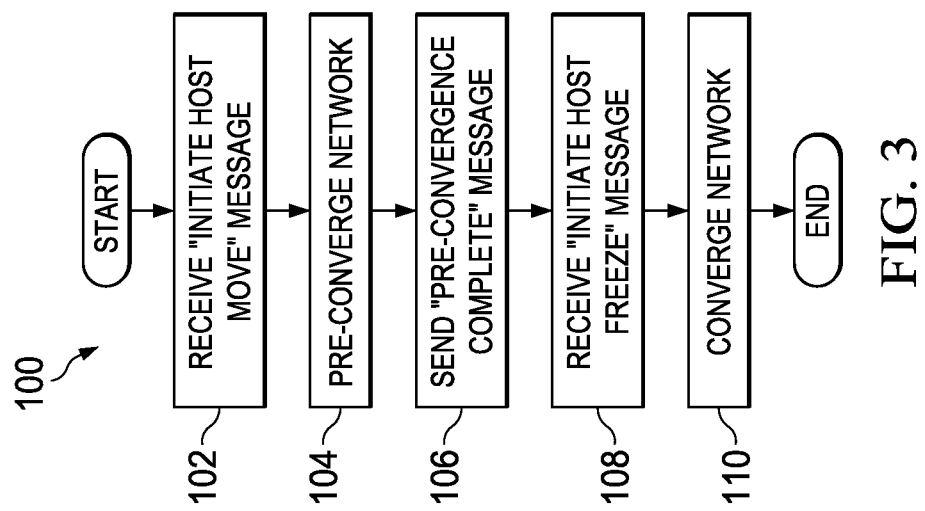

SYNCHRONIZING NETWORK CONVERGENCE AND VIRTUAL HOST MIGRATION

TECHNICAL FIELD

This disclosure relates in general to the field of communications and, more particularly, to synchronizing network convergence and virtual host migration in a network environment.

BACKGROUND

Virtualization is a technology that allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, resulting in multiple virtual machines sharing the same physical server hardware. The virtual machines may move between servers based on traffic patterns, hardware resources, or other criteria. As a virtual machine migrates between servers in a network environment, the virtual machine desirably maintains substantially continuous availability.

BRIEF DESCRIPTION OF DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flow diagram illustrating example operations that can be associated with the communication system.

DETAILED DESCRIPTION OF EXAMPLE EMBODIMENTS

Overview

A system and a method are disclosed for synchronizing network convergence and virtual host migration in a network environment. An exemplary method described herein can perform network convergence activities during a freeze window (period) associated with virtual host migration. In various embodiments, an method includes pre-calculating a route for the virtual host at the destination node upon receiving a message indicating that a mobile host manger will migrate a virtual host from a source node to a destination node in a network. Upon receiving a message indicating that the mobile host manager will freeze the virtual host, the pre-calculated route can be activated at a switch to minimize packet loss while the network converges. In some embodiments, the pre-calculated route may be activated at a switch through which the virtual host at the source node connected to the network. Activating the pre-calculated route may include relaying the message indicating that the mobile host manager will freeze the virtual host to the switch. In some embodiments, the method can include advertising the pre-calculated route to update reachability information for the virtual host in the network. While the virtual host is frozen, network traffic destined for the virtual host at the source node may be redirected to the destination node based on the pre-calculated route. When the virtual host resumes at the destination node, network traffic may be directly forwarded to the virtual host at the destination node.

In various embodiments, the method further includes identifying a network element sending network traffic to the virtual host at the source node, and pre-calculating a route from the network element to the virtual host at the destination node. Upon receiving the message indicating that the mobile host manager will freeze the virtual host, the pre-calculated route at the network element may be activated. In various embodiments, the method further includes sending a message to the mobile host manager upon completing pre-convergence of the network. In various embodiments, the method further includes receiving a message indicating that mobile host manager completed migration of the virtual host from the source node to the destination node. In various embodiments, the method further includes storing the pre-calculated route in a forwarding table associated with the switch.

Example Embodiments

Figure 1:
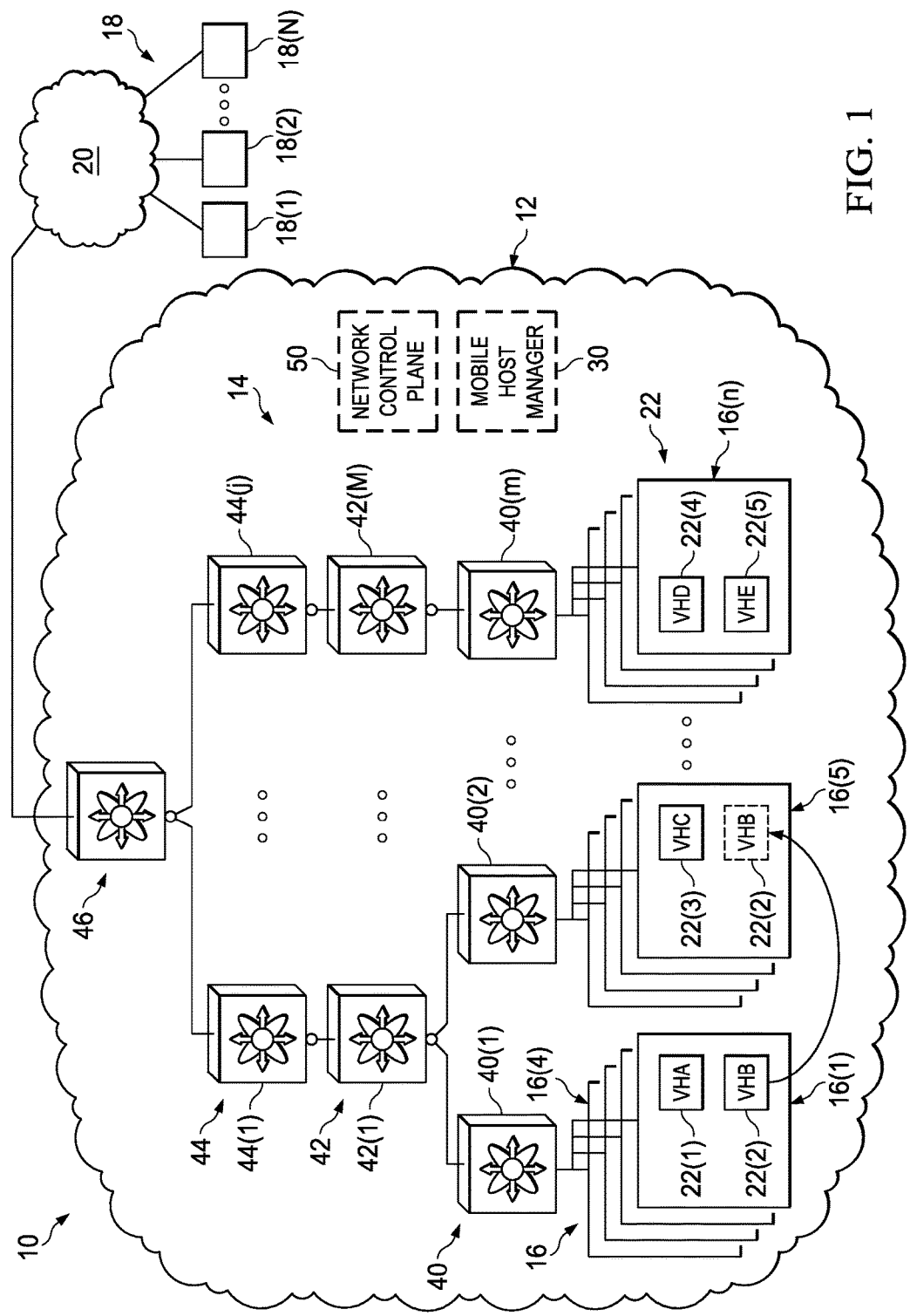
FIG. 1 is a simplified schematic block diagram illustrating a communication system for synchronizing network convergence and virtual host migration in a network environment.
Figure 2:
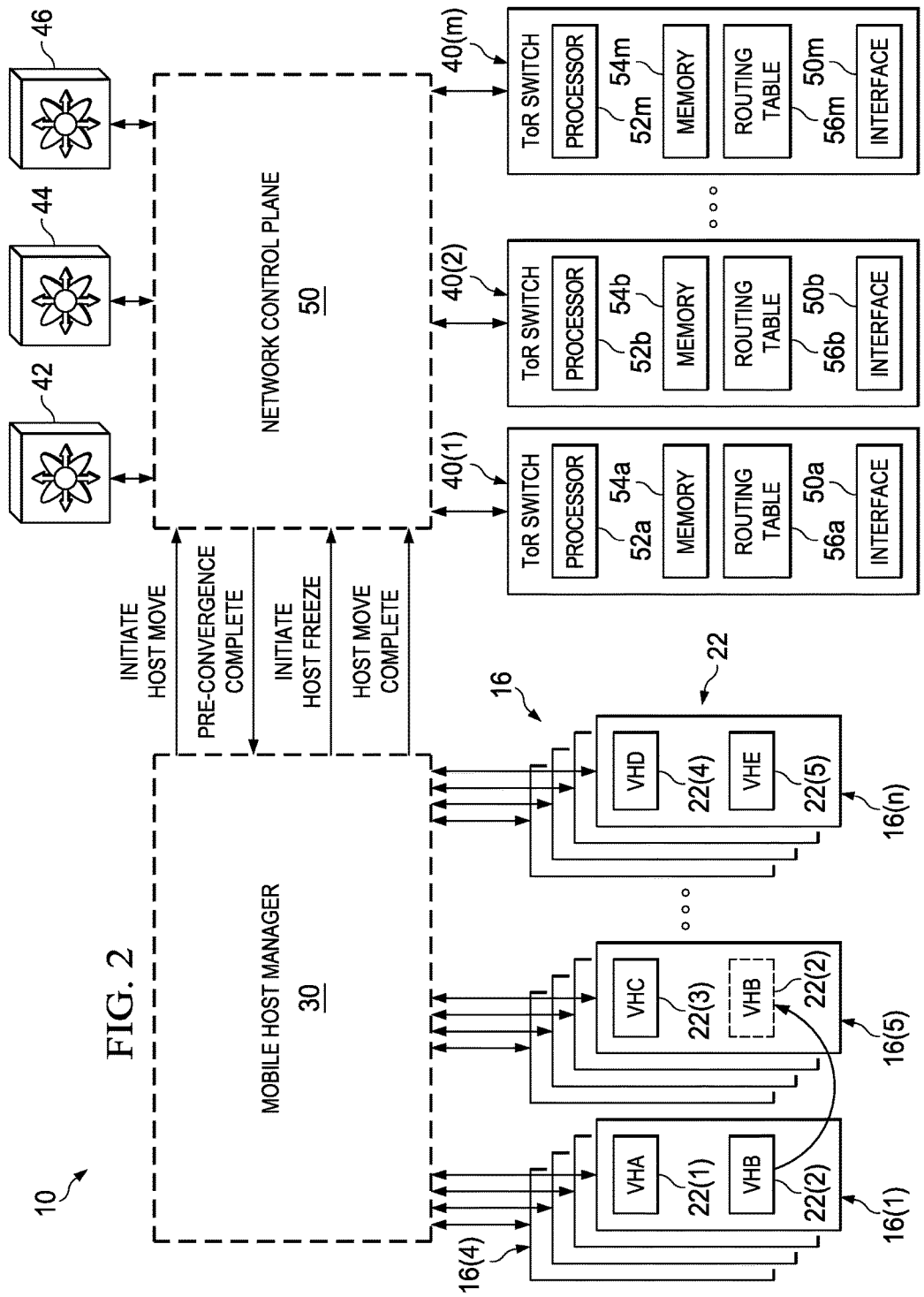
FIG. 2 is a simplified schematic block diagram illustrating example details of the communication system.

FIG. 1 and FIG. 2 are simplified schematic block diagrams illustrating a communication system 10 for synchronizing network convergence and virtual host mobility. For ease of discussion, FIG. 1 and FIG. 2 will be described concurrently. In FIG. 1, communication system 10 includes a network 12, such as an enterprise network operated and controlled by a particular entity or organization. In various implementations, network 12 represents a data center network. Network 12 includes a network 14 (generally shown as various links) that interconnect hosts 16(1), 16(2), . . . , and 16(n) (generally referred to as hosts 16) and remote hosts 18(1), 18(2), . . . , and 18(N) (generally referred to as remote hosts 18), where n represents a total number of hosts 16 and N represents a total number of remote hosts 18. Hosts 16 can communicate (for example, by receiving/forwarding packets) with each other over network 12, and hosts 16 can communicate with remote hosts 18 connected to network 12 over an external network 20. Hosts 16 can communicate with a cloud over external network 20 to form a hybrid network cloud environment. For example, in some embodiments, remote hosts 18 are associated with a cloud, which may be a collection of hardware and software ("cloud infrastructure") forming a shared pool of configurable network resources (such as networks, servers, storage, applications, services, etc.) that can be suitably provisioned to provide on-demand self-service, network access, resource pooling, elasticity and measured service, among other features. As used herein, the term "host" may include any network element, physical (for example, servers) or virtual (for example, virtual machines), connected to other network elements over a network; and the term "remote host" may include any host connected to a network (for example, network 12) over an external network (for example, external network 20). Hosts can provide various information technology services, including web services, database services, data processing services, directory services, and/or other services to network elements. Hosts can be servers, applications, network storage facilities (for example, a database and/or a memory), and/or other network elements.

Virtual hosts can operate on hosts 16 and/or remote hosts 18. For example, hosts 16 may represent physical network elements, such as servers, configured to host virtual hosts 22(1), 22(2), . . . , and 22(q) (generally referred to as virtual hosts 22), where q represents a total number of virtual hosts 22. In FIG. 1 and FIG. 2, virtual host 22(1) and virtual host 22(2) run on host 16(1), virtual host 22(3) runs on host 16(5), and virtual host 22(4) and virtual host 22(5) run on host 16(n). Virtual hosts 22 can be virtual machines that share resources without interfering with each other, enabling multiple operating systems and/or multiple applications to execute concurrently on any one host 16 or remote host 18. Virtual hosts 22 can be provided with computing, storage, and networking services for running application workloads. Virtual hosts 22 may run on hardware abstraction layers, commonly referred to as hypervisors, which provide operating system independence for application workloads served by virtual hosts 22. Hypervisors can dynamically allocate hardware resources to virtual hosts 22.

A mobile host manager (MHM) 30 manages instantiation and migration of virtual hosts 22. Virtual host migration generally refers to virtual host mobility, virtual machine mobility, virtual machine migration, live migration, and/or Vmotion. Mobile host manager 30 may be implemented in software, hardware, firmware, or a combination thereof. Mobile host manager 30 may be implemented using VMware VCenter™, OpenStack™, Microsoft System Center Virtual Machine Manager (VMM)™, or other suitable virtual host management platform. In some embodiments, mobile host manager 30 may be implemented as a clustered application, such as Oracle Real Application Clusters (RAC), that uses virtual presence and state synchronization concepts to distribute/move services provided by the clustered application. In some embodiments, mobile host manager 30 may be implemented as a container (such as a Docker container, Linux® (LXC) container, and/or other suitable container), container manager (such as a Docker Engine, a LXC/LXD container, and/or other suitable container manager), and/or other container-based virtualization technology.

In FIG. 1 and FIG. 2, virtual host 22(2) is shown moving from host 16(1) (referred to as a source node or a departure node) to host 16(5) (referred to as a destination node). Mobile host manager 30 may reassign virtual host 22(2) from host 16(1) to host 16(5) based on various virtual host migration criteria associated with communication system 10. For example, host 16(1) may have reduced processing bandwidth and/or host 16(5) may have increased processing bandwidth, such that mobile host manager 30 determines that re-instantiating virtual host 22(2) on host 16(5) can improve network performance. In some embodiments, virtual host 22(2) may request a move from host 16(1) to host 16(5). Mobile host manager 30 can facilitate virtual hosts 22 moving between hosts 16 and/or remote hosts 18, across Layer 2 or Layer 3 boundaries, based on traffic patterns, hardware resources, and/or other virtual host migration criteria. Virtual host migration can support data center network maintenance, consolidation, or expansion, and provide workload balancing across multiple hosts and/or networks.

When mobile host manager 30 moves virtual host 22(2) a source node to a destination node (such as from physical host 16(1) to physical host 16(5)), mobile host manager 30 copies (replicates) a virtual host state of virtual host 22(2) on host 16(1) and re-instantiates the virtual host state on host 16(5). A virtual host state defines a persona of virtual host 22(2), which can include a processor state, a memory state, a network state, a device state, and/or other attributes that define virtual host 22(2) (including allocated processor, memory, registers, and/or other resources). Since virtual host 22(2) can continue running during the migration process, mobile host manager 30 can copy a portion of the virtual host state until reaching a virtual host state replication completeness threshold, at which time, mobile host manager 30 suspends (freezes) virtual host 22(2) on host 16(1). During the freeze period, virtual host 22(2) is unavailable (unreachable), and mobile host manager 30 copies a remaining virtual host state of virtual host 22(2) on host 16(1), such as any memory state or other state that has been modified during the migration, to host 16(5). The virtual host state replication completeness threshold defines how complete the virtual host state replication should be before suspending virtual host 22(2) on the source node, host 16(1). In some implementations, to minimize a freeze window (a time that virtual host 22(2) is unavailable), the virtual host state replication completeness threshold may be close to 100% so that the remaining virtual host state for copying by mobile host manager 30 is as small as possible. For example, virtual host state replication completeness threshold can be met when mobile host manger 30 has copied about 95% of the virtual host state of virtual host 22(2) from host 16(1) to host 16(5), where 5% has been identified as actively changing. When mobile host manager 30 completes copying of the remaining virtual host state of virtual host 22(2) on host 16(1) to host 16(5), mobile host manager 30 can resume (unfreeze) virtual host 22(2) on host 16(5).

Network 14 (also referred to as a switch fabric) includes various network nodes configured to aggregate and distribute network traffic in network 12. For example, network 14 may include access switches, aggregation switches, and/or core switches to aggregate and distribute ingress (upstream traffic) and egress (downstream traffic) traffic. Various switches (virtual and/or physical) may be provided at each access, aggregation, and core level to achieve redundancy within network 12. In the depicted embodiment, network 14 includes top of rack (ToR) switches 40(1), 40(2), . . . , and 40(m) (generally referred to as ToR switches 40) that connect hosts 16 to network 12, where m is a total number of ToR switches 40; access switches 42(1), 42(2), . . . , and 42(M) (generally referred to as access switches 42) that aggregate network traffic from ToR switches 40, where M is a total number of access switches 42; core switches 44(1), 44(2), . . . , and 44(j) (generally referred to as core switches 44) that aggregate network traffic from access switches 42, where j is a total number of core switches 44; and aggregate switches 46 that aggregate network traffic from core switches 44, and further connect external network 20 and/or remote hosts 18 to network 12. Network 14 can further include virtual switches that can support bridging between virtual hosts 22. For example, each host 16 may be provisioned with a virtual switch, such as a Virtual Ethernet Module (VEM), that provides network capability to virtual hosts 22 running thereon. In some embodiments, virtual switches provisioned at each host 16 may be part of a distributed virtual switch (DVS) that functions as a virtual switch across associated hosts 16. ToR switches 40, access switches 42, core switches 44, aggregate switches 46, and virtual switches can connect to network 12 via network interfaces, such as ports through which ToR switches 40, access switches 42, core switches 44, aggregate switches 46, and/or virtual switches connect to one another.

In various embodiments, each ToR switch 40 can serve as a top-of-rack switch of a respective rack unit in a data center network environment, where network 12 serves as the data center network. For example, in the depicted embodiment, host 16(1) through host 16(4) may be physical host servers associated with a rack unit, where the rack unit is served by ToR switch 40(1). ToR switches 40 can include host interfaces, for example, ports through which hosts 16 connect to ToR switches 40, such that ToR switches 40 can exchange data (forward/receive packets) between hosts 16 over network 12 via access switches 42, core switches 44, and/or aggregate switches 46. Aggregate switches 46 can connect to external network 20 via another network interface, such that aggregate switches 46 can exchange data (forward/receive packets) between hosts 16 and remote hosts 18 over network 12 via core switches 44, access switches 42, and/or ToR switches 40. In some network topologies, network 14 can include one level of switches (such as a 2-tier fat tree topology) or multiple levels of switches (such as a 3-tier fat tree topology). Virtually any number of switches may be used in network 14 depending on network topology considerations for communication system 10. Furthermore, network 14 may alternately be configured to achieve spine/leaf network topologies that include leaf switches, border leaf switches, and/or spine switches (also referred to as a fabric spine).

As used herein, the term "switch" includes any network element, physical and/or virtual, configured to receive packets from a source node and forward packets appropriately to a destination node in a network or a destination node out of network. The term "ToR switch" is inclusive of routers, switches, and such other network elements with packet routing, bridging, and switching functionalities that are connected to one or more hosts (e.g., hosts 16). The term "aggregate switch" is inclusive of routers, switches, and such other network elements with packet routing, bridging, and switching functionalities that are connected to external entities, such as one or more remote hosts (e.g., remote hosts 18). The term "access switch" and/or "core switch" is inclusive of routers, switches, and such other network elements with packet routing, bridging, and switching functionalities that connect one or more switches (e.g., ToR switches 40, access switches 42, core switches 44, and/or aggregate switches 46). Further, the terms "ToR," "access," "core," and "aggregate" are used merely to distinguish between layers of switches in network 14 depicted in FIG. 1, and are not meant to be limitations. Furthermore, as used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information.

In FIG. 2, ToR switch 40(1) includes a network interface 50a, a processor 52a, and a memory 54a that may be interconnected by a system interconnect (not shown); ToR switch 40(2) includes a network interface 50b, a processor 52b, and a memory 54b that may be interconnected by a system interconnect (not shown); and ToR switch 40(m) includes a network interface 50m, a processor 52m, and a memory 54m that may be interconnected by a system interconnect (not shown). The present disclosure contemplates that other ToR switches 40, access switches 42, core switches 44, and/or aggregate switches 46 may be configured similarly. Network interface 50a, network interface 50b, and network interface 50m respectively couple ToR switch 40(1), ToR switch 40(2), and ToR switch 40(m) to network 14, enabling communication between ToR switch 40(1), ToR switch 40(2), ToR switch 40(m), and their respective connected hosts and/or switches. Network interface 50a, network interface 50b, and network interface 50m can include mechanical, electrical, and signaling circuitry for communicating data over links connected to network 14. Network interface 50a, network interface 50b, and network interface 50m are configured to transmit and/or receive network traffic using a variety of different communication protocols over physical links or wireless links.

Processor 52a, processor 52b, and processor 52m can include any necessary elements or logic adapted to execute software programs and processes and manipulate data. Memory 54a, memory 54b, and memory 54m can store software programs and data associated with operations described herein. An operating system (not shown), portions of which may be resident in memory 54a and executed by processor 52a, can functionally organize ToR switch 40(1), invoking network operations in support of software processes and/or services executing on ToR switch 40(1); an operating system (not shown), portions of which may be resident in memory 54b and executed by processor 52b, can functionally organize ToR switch 40(2), invoking network operations in support of software processes and/or services executing on ToR switch 40(2); and an operating system (not shown), portions of which may be resident in memory 54m and executed by processor 52m, can functionally organize ToR switch 40(m), invoking network operations in support of software processes and/or services executing on ToR switch 40(m). ToR switch 40(1), ToR switch 40(2), and ToR switch 40(m) may each include a routing process (service) that can be executed respectively by processor 52a, processor 52b, and processor 52m to perform functions provided by a network control plane, such as a network control plane 50. ToR switch 40(1), ToR switch 40(2), and ToR switch 40(m) along with other switches in network 14, respectively include a routing table 56a, a routing table 56b, and a routing table 56m that stores routing information that defines routes through network 12. ToR switch 40(1), ToR switch 40(2), and ToR switch 40(m) can use the routing information to make routing/forwarding decisions. The term "route" can generally refer to a path between two locations in communication system 10.

Network control plane (NCP) 50 facilitates routing of network traffic associated with network 14. For example, network control plane 50 enables switches of network 14 (including, but not limited to, virtual switches, ToR switches 40, access switches 42, core switches 44, and/or aggregate switches 46) to exchange reachability information for hosts 16, remote hosts 18, virtual hosts 22, and/or any other hosts in communication system 10. Network control plane 50 may be implemented in software, hardware, firmware, or a combination thereof. Network control plane 50 includes any network control protocols or control traffic processing associated with switches forwarding network traffic in communication system 10. Exemplary network control protocols include address resolution protocol (ARP), border gateway protocol (BGP), open shortest path first (OSPF), or any other network control protocol that "glues" together communication system 10. In some embodiments, network control plane 50 can be implemented using a location directory based network control protocol, such as locator/identifier separation protocol (LISP). In some embodiments, network control plane 50 can be implemented using a domain name system (DNS). In some embodiments, network control plane 50 can be implemented by a network controller. In some embodiments, network control plane 50 can include a virtual supervisor module (VSM) that provides control plane functionality for virtual hosts 22, for example, by controlling virtual switches in network 14. Virtual switches can be configured through the VSM to perform Layer 2 switching and advanced networking functions, such as port channels, quality of service (QoS), security (for example, private virtual local area network (VLAN), port security, etc.), and monitoring (for example, Netflow, switch port analyzer (SPAN), encapsulated remote SPAN, etc.). In some embodiments, network control plane 50 is integrated in one or more switches associated with communication system 10.

Network control plane 50 can process routing, signaling, and control protocols that dictate network traffic forwarding behavior of a data plane associated with switches of network 14. Network control plane 50 can modify forwarding (routing) tables associated with switches in network 14, such as routing table 56a, routing table 56b, and routing table 56m, to effect route changes in communication system 10. In various embodiments, network control plane 50 converges each time a virtual host migrates in communication system 10, updating any routing information associated with the migrated virtual host. For example, when virtual host 22(2) migrates from host 16(1) to host 16(5), network control plane 50 can calculate and update routing information for virtual host 22(2) to reflect its new location at host 16(5). Network control plane 50 may be referred to as fully converged when all switches associated with network 14 adapt to reflect virtual host 22(2) at its new location, such that network traffic destined for virtual host 22(2) is appropriately directed to its new location. In various embodiments, network control plane 50 may be referred to as fully converged when all network elements sending traffic to a host, such as virtual host 22(2), are provisioned with routes for reaching the host at its new location.

Communication system 10 can include a network topology configured to include any number of hosts, virtual hosts, remote hosts, switches, routers, and other network nodes interconnected to form network 12. Network elements of FIG. 1 and FIG. 2 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of Transmission Control Protocol/Internet Protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Furthermore, the exemplary network environment may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

For purposes of illustrating the techniques of communication system 10, it is important to understand the communications in a given system such as the architecture shown in FIG. 1 and FIG. 2. The following foundational information may be viewed as a basis from which the present disclosure may be properly explained. Such information is offered earnestly for purposes of explanation only and, accordingly, should not be construed in any way to limit the broad scope of the present disclosure and its potential applications.

Stateful IP hosts, such as virtual hosts 22, are mobile in modern data centers. Mobile host manager 30 enables virtual host mobility by copying a virtual host's state, including processor state and memory state, from a source node to a destination node. Simultaneously, network control plane 50 converges and adapts network 14 to provide reachability for the virtual host at its new location, the destination node. Ideally, virtual hosts 22 can migrate seamlessly without causing any traffic loss or glitches in any services provided by virtual hosts 22. However, in typical network environments, mobile host manager 30 does not communicate virtual host migration events to network control plane 50, and network control plane 50 does not communicate network convergence events to mobile host manager 30. For example, when mobile host manager 30 migrates virtual host 22(2) from host 16(1) to host 16(5), network control plane 50 assumes that virtual host 22(2) remains at host 16(1) when in a frozen state. Then, when virtual host 22(2) resumes on host 16(5), network control plane 50 triggers network convergence, where network 14 is updated to reflect that virtual host 22(2) is at a new location, host 16(5). Virtual host 22(2) is thus unreachable while frozen, such that any network traffic sent to virtual host 22(2) at host 16(1) is lost while frozen. Further, virtual host 22(2) remains unreachable while network control plane 50 re-converges network 14.

Communication system 10 is configured to address the issues described above (and others) in offering a mechanism for synchronizing network convergence and virtual host migration. Embodiments of communication system 10 implement a handshake between mobile host manager 30 and network control plane 50 that synchronizes virtual host migration events and network convergence events associated with virtual host migration. For example, mobile host manager 30 notifies network control plane 50 of relevant virtual host migration events associated with a virtual host migration, and network control plane 50 notifies mobile host manager 30 of relevant network convergence events associated with the virtual host migration. Communication system 10 provides mobile host manager 30 and network control plane 50 with visibility into one another's processes, allowing both mobile host manager 30 and network control plane 50 to optimize behavior and minimize communication downtime associated with migrating a virtual host. By synchronizing network convergence with different phases of virtual host state replication, communication system 10 can minimize or even eliminate communication loss that typically arises from network convergence associated with virtual host migration. The network convergence and virtual migration mobility synchronization schemes described herein can enable virtual host move and network convergence operations to run in parallel, accelerating virtual host move times. Such schemes can prevent race conditions that essentially eliminate (or significantly reduce) network traffic losses that may result from network re-convergence delays when virtual hosts move within communication system 10. Different embodiments may have different advantages than described herein, and no particular advantage is necessarily required of any of the embodiments described herein.

Communication system 10 can insert network convergence within a freeze window associated with virtual host migration. Returning to FIG. 1 and FIG. 2, consider when virtual host 22(2) migrates in network 12. Mobile host manager 30 can determine that virtual host 22(2) should be reassigned from host 16(1) to host 16(5) based on various virtual host migration criteria or based on a request received from virtual host 22(2), host 16(1), or other network element. As mobile host manager 30 begins copying (replicating) a virtual host state associated with virtual host 22(2) from host 16(1) to host 16(5), mobile host manager 30 can issue an "Initiate Host Move" message to network control plane 50. "Initiate Host Move" message informs network control plane 50 that mobile host manager 30 has initiated (or is about to initiate) a virtual host migration for virtual host 22(2). "Initiate Host Move" message can specify a source node (host 16(1)) and a destination node (host 16(5)) associated with virtual host 22(2) migration. Network control plane 50 can store information associated with the virtual host migration, including the source node and the destination node.

Upon receiving "Initiate Host Move" message, network control plane 50 performs a network pre-convergence process, where network control plane 50 pre-calculates and updates reachability information for virtual host 22(2), such that network traffic destined for virtual host 22(2) may be routed appropriately when virtual host 22(2) migrates to its new location, host 16(5). For example, when virtual host 22(2) runs on host 16(1) attached to network 12 through ToR switch 40(1), network traffic destined for virtual host 22(2) is routed through ToR switch 40(1). When virtual host 22(2) begins running on host 16(5) attached to network 12 through ToR switch 40(2), network control plane 50 will need to update routing information for virtual host 22(2) to ensure that network traffic destined for virtual host 22(2) is routed through ToR switch 40(2). Network control plane 50 can pre-calculate routes that will reach virtual host 22(2) when located at host 16(5). Pre-calculated routes generally include any valid, new routes that provide reachability to virtual host 22(2) running on host 16(5). In the present example, network control plane 50 pre-calculates a route that will redirect (bounce) network traffic for virtual host 22(2) received at ToR switch 40(1) to ToR switch 40(2). In some embodiments, network control plane 50 can forward the pre-calculated route to ToR switch 40(1), and ToR switch 40(1) can store the pre-calculated route in routing table 56a, though ToR switch 40(1) will not activate (enforce) the pre-calculated route at this time. When network control plane 50 completes network pre-convergence, network control plane 50 can issue a "Pre-convergence Complete" message to mobile host manager 30. "Pre-Convergence Complete" message informs mobile host manager 30 that network 12 has been fully pre-converged, indicating that network control plane 50 has pre-calculated all (or most, in some implementations) future routes associated with virtual host 22(2) located at host 16(5) (the destination node).

Typically, mobile host manager 30 replicates the virtual host state of virtual host 22(2) on host 16(1) until reaching a virtual host state replication completeness threshold, at which time mobile host manager 30 freezes (suspends) virtual host 22(2). In communication system 10, mobile host manager 30 waits to receive "Pre-Convergence Complete" message from network control plane 50 before freezing virtual host 22(2). By delaying a freeze of virtual host 22(2) until network control plane 50 has completed pre-convergence, communication system 10 ensures that virtual host 22(2) remains active and reachable at host 16(1) while network 14 pre-converges, which can prevent traffic loss (such as black holing of traffic) that typically results from network convergence delays and/or pre-maturely enforcing routes associated with virtual host 22(2) at host 16(5). At this point, both mobile host manager 30 and network control plane 50 have performed as much due diligence as possible in anticipation of migrating virtual host 22(2) from host 16(1) to host 16(5). Once mobile host manager 30 receives "Pre-Convergence Complete" message from network control plane 50, mobile host manager 30 freezes virtual host 22(2). The following discussion describes operations that can be performed to complete virtual host migration in a synchronized manner that minimizes any downtime, a time for which a virtual machine being migrated is not available or unreachable.

Mobile host manager 30 can issue an "Initiate Host Freeze" message to network control plane 50, for example, when mobile host manager 30 reaches the virtual host state replication completeness threshold when replicating the virtual host state of virtual host 22(2). "Initiate Host Freeze" message informs network control plane 50 that mobile host manager 30 has (or is about to) freeze virtual host 22(2). Upon receiving "Initiate Host Freeze" message, network control plane 50 activates (enforces) the pre-calculated route at any switch that can minimize packet loss using the pre-calculated route while the network converges (for example, until network 14 fully converges). In the present example, network control plane 50 activates the pre-calculated route at the departure location of virtual host 22(2) so that any network traffic destined for virtual host 22(2) at its old, departure location (host 16(1)) can be bounced (redirected) to its new, destination location (host 16(5)). In some embodiments, network control plane 50 immediately relays "Initiate Host Freeze" message to ToR switch 40(1) providing virtual host 22(2) connectivity to network 12 at host 16(1), triggering ToR switch 40(1) to enforce the pre-calculated route so that any network traffic received at ToR switch 40(1) for virtual host 22(2) can be bounced to ToR switch 40(2), which will provide virtual host 22(2) connectivity to network 12 when migrated to host 16(5).

Simultaneously, network control plane 50 can update reachability information for virtual host 22(2) by advertising the new, pre-calculated route to switches in network 14 (including virtual switches, ToR switches 40, access switches 42, core switches 44, and/or aggregate switches 46). In some embodiments, switches associated with network 14 can update associated routing tables to reflect routes to virtual host 22(2) when operating on host 16(5). Though network-wide enforcement of the pre-calculated routes may take some time, communication system 10 prevents (minimizes) any network traffic loss as network 14 converges since network control plane 50 activates the pre-calculated route at the old, departure location, which punts (redirects) network traffic destined for virtual host 22(2) at the departure location to the new, destination location. This provides network 14 ample time to re-converge, including any remote network elements. The pre-calculated route will correct any use of routes to virtual host 22(2) at host 16(1) while network 14 fully converges to reflect virtual host 22(2) at host 16(5). Communication system 10 has a converged network topology when all network elements have reachability information for virtual host 22(2) at its new location.

To guarantee that virtual host 22(2) is reachable as soon as it emerges from a freeze state on host 16(5), network control plane 50 prioritizes updating forwarding (routing) information for virtual hosts 22(2) at any switches and/or network elements associated with the its old, departure location (host 16(1)). By pre-calculating a route for use at the departure location and activating the pre-calculated route concurrently with mobile host manager 30 suspending virtual host 22(2), network control plane 50 ensures that network 14 will redirect any network traffic destined to virtual host 22(2) to its new, destination location (host 16(5)), even before virtual host 22(2) resumes operation at the new, destination location. In some embodiments, network control plane 50 can identify network elements/nodes actively sending network traffic to virtual host 22(2), pre-calculate routes for from the identified network elements to virtual host 22(2) at its destination location, and activate the pre-calculated routes concurrently with mobile host manager 30 freezing virtual host 22(2). By doing so, network control plane 50 can ensure that any known senders to virtual host 22(2) begin sending network traffic to virtual host 22(2) at the new, destination location (host 16(5)) while mobile host manager 30 freezes virtual host 22(2), minimizing any bounced traffic that may be experienced (such as from ToR switch 40(1) to ToR switch 40(2)) while mobile host manager 30 completes migration of virtual host 22(2). Bouncing/redirecting may continue until network control plane 50 fully converges, at which point, network 14 can directly send network traffic to virtual host 22(2) at its new, location the new location and no further bouncing is necessary.

Mobile host manger 30 can then complete migration of virtual host 22(2). While virtual host 22(2) is frozen, mobile host manager 30 replicates any remaining portion of the virtual host state to host 16(5) without risking further changes to the virtual host state that would arise from activity that may occur while virtual host 22(2) is running on host 16(1), and then unfreezes (resumes) virtual host 22(2) on host 16(5). Mobile host manager 30 can issue a "Host Move Complete" message to network control plane 50. By implementing the operations above, at this point, network control plane 50 will be fully converged when mobile host manager 30 unfreezes virtual host 22(2) on host 16(5). Network control plane 50 can use "Host Move Complete" message to trigger any clean-up of any network topology issues/states arising from the pre-calculated routes. Alternatively, network control plane 50 can clean up any network topology issues/states when the pre-calculated route is activated at the old, departure location as mobile host manager 30 freezes virtual host 22(2).

Turning to FIG. 3, FIG. 3 is a simplified flow diagram illustrating example operations 100 that may be associated with various embodiments of communication system 10. At block 102, a network control plane receives an "Initiate Host Move" message from a mobile host manager, which indicates that the mobile host manager will begin migrating a virtual host in a network from a source node to a destination node. At block 104, the network control plane pre-converges the network. For example, the network control plane pre-calculates routes that will be valid for the virtual host when located at the destination node. At block 106, the network control plane sends mobile host manager a "Pre-Convergence Complete" message, which indicates that that the network control plane has pre-calculated any necessary routes for the virtual host at the destination node. At block 108, the network control plane receives an "Initiate Host Freeze" message from the mobile host manager, which indicates that the mobile host manager will suspend the virtual host on the source node and complete migration of the virtual host to the destination node. At block 110, the network control plane can converge the network. For example, the network control plane can activate a pre-calculated route at any switch that will minimize packet loss while the network converges. For example, network control plane activates the pre-calculated route at a switch through which the virtual host at the source node connected to the network. The network control plane can also advertise the pre-calculated route to other switches and/or network elements to update reachability information for the virtual host at the destination node. In various embodiments, the network control plane fully converges before the virtual host resumes operation on the destination node.

In example implementations, at least some portions of the activities outlined herein may be implemented in software in, for example, mobile host manager 30 and/or network control plane 50. In some embodiments, one or more of these features may be implemented in hardware, provided external to these elements, or consolidated in any appropriate manner to achieve the intended functionality. Various network elements described herein (for example, hosts, switches, mobile host manager 30, and/or network control plane 50) may include software (or reciprocating software) that can coordinate in order to achieve the operations as outlined herein. In still other embodiments, these elements may include any suitable algorithms, hardware, software, components, modules, interfaces, or objects that facilitate the operations thereof. Furthermore, hosts, switches, mobile host manager 30, and/or network control plane 50 described and shown herein (and/or associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, a processor can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA)), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described herein should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", "various implementations" and the like are intended to mean that any such features are included in one or more embodiments of the present disclosure, but may or may not necessarily be combined in the same embodiments.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of the communication system 10 as described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    upon receiving a message indicating that a mobile host manager will migrate a virtual host from a source node to a destination node in a network, pre-calculating a route for network traffic destined for the virtual host at the source node to reach the virtual host at the destination node, comprising:
        identifying a network element sending network traffic to the virtual host at the source node; and
        pre-calculating a route from the network element to the virtual host at the destination node; and
    upon receiving a message indicating that the mobile host manager will place the virtual host in a frozen state, activating the pre-calculated routed at the network element to minimize packet loss while the network converges, wherein the activating the pre-calculated route comprises redirecting through the network element network traffic destined for the virtual host at the source node to the destination node via the pre-calculated route;
    wherein while the virtual host is in the frozen state, communication cannot be had with the virtual host.

2. The method of claim 1, further comprising advertising the pre-calculated route to update reachability information for the virtual host in the network.

3. The method of claim 1, further comprising, when the virtual host resumes at the destination node, directly forwarding network traffic to the virtual host at the destination node.

4. The method of claim 1, further comprising sending a message to the mobile host manager upon completing pre-convergence of the network.

5. The method of claim 1, further comprising receiving a message indicating that mobile host manager completed migration of the virtual host from the source node to the destination node.

6. The method of claim 1, further comprising converging the network while the virtual host is frozen.

7. The method of claim 1, wherein activating the pre-calculated route includes relaying the message indicating that the mobile host manager will place the virtual host in a frozen state to the network element.

8. A non-transitory media encoded with logic that includes code for execution, and when executed by a processor, is operable to perform operations comprising:

upon receiving a message indicating that a mobile host manager will migrate a virtual host from a source node to a destination node in a network, pre-calculating a route for network traffic destined for the virtual host at the source node to reach the virtual host at the destination node, comprising:
- identifying a network element sending network traffic to the virtual host at the source node; and
- pre-calculating a route from the network element to the virtual host at the destination node; and upon receiving a message indicating that the mobile host manager will place the virtual host in a frozen state, activating the pre-calculated route at the network element to minimize packet loss while the network converges, wherein the activating the pre-calculated route comprises redirecting through the network element the network traffic destined for the virtual host at the source node to the destination node via the pre-calculated route;

wherein while the virtual host is in the frozen state, communication cannot be had with the virtual host.

9. The non-transitory media of claim 8, the operations further comprising advertising the pre-calculated route to update reachability information for the virtual host in the network.

10. A system comprising:
- a memory element for storing data; and
- a processor operable to execute instructions associated with the data, wherein the processor and the memory element cooperate such that the system is configured for:

upon receiving a message indicating that a mobile host manager will migrate a virtual host from a source node to a destination node in a network, pre-calculating a route for network traffic destined for the virtual host at the source node to reach the virtual host at the destination node, comprising:
- identifying a network element sending network traffic to the virtual host at the source node; and
- pre-calculating a route from the network element to the virtual host at the destination node; and upon receiving a message indicating that the mobile host manager will place the virtual host in a frozen state, activating the pre-calculated route at the network element to minimize packet loss while the network converges, wherein the activating the pre-calculated route comprises redirecting through the network element network traffic destined at the virtual host from the source node to the destination node via the pre-calculated route;

wherein while the virtual host is in the frozen state, communication cannot be had with the virtual host.

11. The system of claim 10, further configured for advertising the pre-calculated route to update reachability information for the virtual host in the network.

12. The system of claim 10, further configured for sending a message to the mobile host manager upon completing pre-convergence of the network.

* * * * *